March 28, 1967 M. W. HUFF 3,311,238
SUCTION ROLLER APPARATUS
Filed Dec. 29, 1965
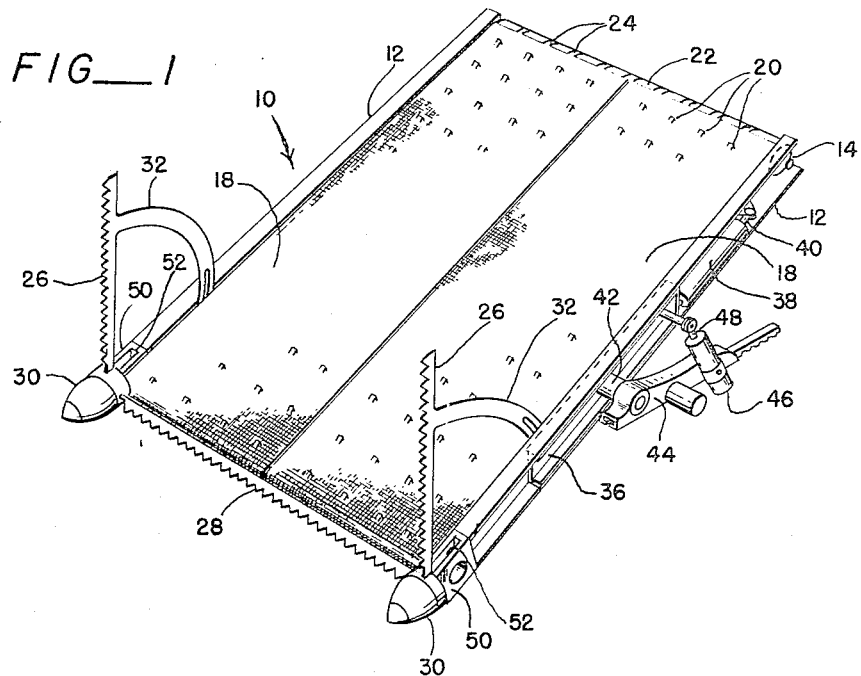
FIG.—1
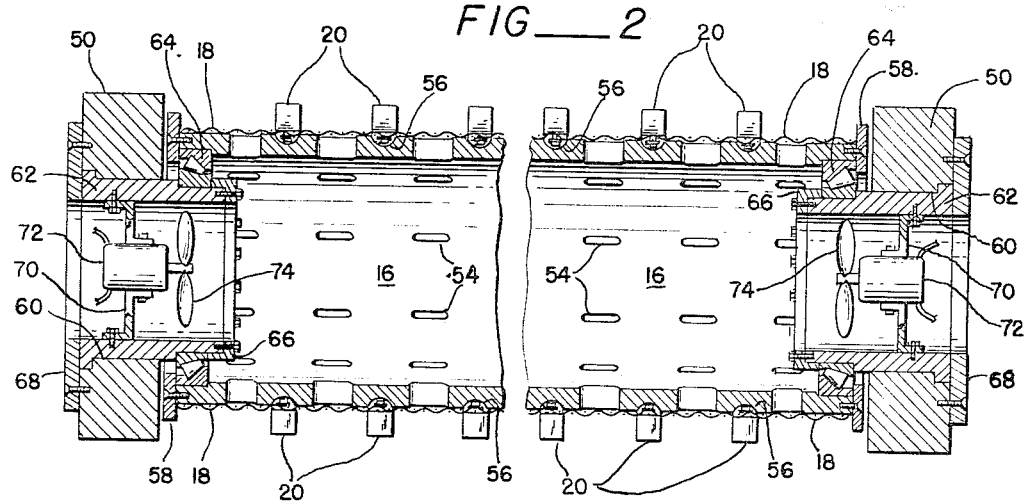
FIG.—2
M. WALTER HUFF
INVENTOR.
BY Draybeal, Cole & Barnard
ATTORNEYS

3,311,238
SUCTION ROLLER APPARATUS

Major Walter Huff, West Vancouver, British Columbia, Canada, assignor to Pacific Kelp Company Ltd., Vancouver, British Columbia, Canada, a British Columbia corporation Filed Dec. 29, 1965, Ser. No. 517,376
6 Claims. (Cl. 210—160)

This invention relates to a new and novel suction roller to be used with conveyors. More particularly does the invention relate to a unique suction roller assembly incorporated in a conveyor for assisting in the pickup of material onto such conveyor.

The type of conveyor with which this invention is intended to be used may have many specific uses aside from the one to which it is primarily directed according to the terms of this specific application. The harvesting of sea plants is accomplished generally by ocean-going vessels which have attached thereto substantial conveyor systems which are mounted at one end of the vessel. The conveyors are large pieces of machinery mounted at an angle on the vessel and extending from a point below the surface of the water and keel to a point above a cargo hold in which the harvested sea plant material is deposited after it has been cut and picked up by the conveyor. One of the problems with which the industry is faced stems from the nature of the sea plant material itself at the time that it is cut, customarily by sickle bars attached to the lower submerged end of the conveyor. If in harvesting the sea plant material the kelp bulb is cut by the cutter bars, the severed section of the plant will begin to sink immediately. Since the vessel with the conveyor means attached thereto will be moving through the kelp beds at perhaps two or three knots, the severed kelp may well sink and slide under the conveyor or drop away from it entirely before it has been picked up by the conveyor. If the conveyor is mounted at the stern end of the vessel so that additional pull is exerted against the severed sea plant material by the ship's propellers, a sizeable quantity of the harvested kelp escapes the conveyor and is lost.

This invention is designed to minimize loss of harvested sea plant material and kelp. The conveyor is a pervious or mesh type continuous belt supported on a generally rectangular frame. The upper conveyor roller has the belt drive means connected thereto while the lower end of the conveyor, with which this invention is concerned, is an idler type roller. The conveyor is mounted in the harvesting vessel so that it can be moved forwardly and aft, can be pivoted through a desired arc, and can be extended and retracted within the plane in which it is disposed. The lower end of the conveyor is equipped with horizontal and vertical cutter bars which can be adjusted to maintain their proper cutting position regardless of the angle of disposition of the conveyor. The roller with which this invention is concerned extends across the lower end of the conveyor frame immediately behind the horizontal cutter. It is an elongated cylindrical device with orifices or slots therein to permit the passage of water through the pervious conveyor belt and to the inside of the cylindrical roller. The roller is provided with impeller means which draw water from inside the roller and discharge it through side openings in the conveyor frame at each end of the roller. The power driven impellers draw sufficient water into the roller to create considerable suction adjacent the lower end of the conveyor. Thus, as soon as sea plant material and kelp has been cut by the cutter bars, instead of dropping away from the conveyor, the suction immediately draws the cut material onto the lower end of the conveyor where the cleats or lugs which are part of the conveyor belt pick the sea plant material up and carry it onto the conveyor surface.

Accordingly, it is a prime feature of this invention to provide a suction roller for conveyors used in raising harvested sea plant material and kelp from the water into a harvesting vessel. It is another feature of this invention to supply a suction roller for conveyors which is simple in design, rugged in construction, and economical to produce. Still another feature of this invention is to furnish a suction roller for submersible conveyors which draws free-floating sea plant and kelp material to the lower end of the conveyor to prevent loss of such material. Yet another feature of this invention is to provide a suction roller for conveyors which minimizes the loss of harvested material by drawing such material immediately onto the conveyor before it has sunk and become lost. These and other objects, features and advantages reside in the details of construction and operation of the apparatus as more fully hereinafter described and claimed. Reference will be had to the accompanying drawings, forming a part hereof, wherein like numerals refer to like parts throughout, and in which:

FIGURE 1 is a view in perspective showing in general detail the disposition of a conveyor used with ocean-going sea plant harvesting vessels, including cutter bars and with which the device of this invention is used; and FIGURE 2 is a cross-section view of the invention as it is located in the lower end of the conveyor.

Referring now to the drawings it will be seen that the conveyor table, generally designated by the number 10, is a large rectangular frame structure having side frame members 12. A driven roller 14 is at the upper end of the conveyor and extends between the two side members 12. The suction roller, generally designated by the number 16, is located at the lower end of the conveyor and also extends between side frame members 12. A pervious belt means 18 is mounted on the rollers and is provided with a plurality of lugs or cleats 20. The upper end of the conveyor also has a comb element 22 with grooves 24 therein for receiving the lugs or cleats 20. The cleats coact with the comb in such a way as to wipe the plant material off the conveyor belt as the belt 18 makes the turn at the upper end of the conveyor frame. At the lower end of the belt are located vertical cutter bars 26 and a horizontal cutting bar 28. The nacelles 30 house the hydraulic motors for driving the cutter bars. The cutter bars and nacelles are capable of adjustment so as to be maintained in their essentially horizontal and vertical positions regardless of the angle of disposition of the conveyor. Thus, circular adjustment arms 32 are attached to the vertical cutter bars 26 and by appropriate power means connected to the other end of the adjustment bars the position of the cutters may be regulated as desired. While numerous features of the conveyor itself are not essential to an understanding of this invention, it should be pointed out that the main conveyor frame members 12 are interconnected by appropriate cross frame members and that additional intermediate supporting rollers would be provided to carry the belt and its load.

The conveyor frame is slidably supported on each side by guide rail 36 which is interconnected with frame member 12 by cylinder 38 attached to the guide rail and piston 40 attached to the frame member. Cylinder 38 raises and lowers the conveyor table. Guide rail 36 has trunion 42 mounted in bearing structure 44 so that the conveyor frame may be tilted about the trunion shaft 42. Additionally the bearing structure 44 is designed in such a way that it can be moved backward and forward or fore and aft in a generally horizontal plane to add to the maneuverability of the conveyor. A cylinder 46 is attached to bearing structure 44 and has a piston 48 pivotally secured to guide rails 36 for pivoting the conveyor to the desired angle of incline. At the lower end of each of the main side frame members 12 is a roller mounting block 50 which is slotted as at 52 to pivotally receive a tongue (not shown) at the rear of nacelle 30 to allow for adjustment of the horizontal and vertical cutter bars and nacelles 30.

Referring now to FIGURE 2 it will be seen that the main roller is an elongated cylindrical element 16 preferably made of steel or some other appropriately strong material such as resin reinforced fiberglass. The roller is provided with a plurality of slots or openings 54 which are longer (larger) towards the center of the roller and which become progressively smaller towards the ends of the roller. The slots of course permit water to be drawn through the conveyor belt 18 and through the slots, thus creating the suction effect around the lower end of the conveyor belt. Annular grooves 56 are formed in the outside surface of roller 16 to accommodate fastenings for lugs 20 on belt 18. Grooves 56 also keep the conveyor belt straight and in position. At each end of the roller is located a flat ring element 58 which acts as a guide flange for each side of belt 18. As will be seen the roller is open at each end and is rotatably supported. Each frame block 50 is provided with a large diameter opening 60 into which is inserted spindle member 62. Spindle members 62 are non-rotatably secured to the frame blocks 50 and extend inwardly and protrude into the ends of roller 16. Spindles 62 are generally concentric with roller 16 in such a way as to accommodate bearing structures 64 between the roller and the spindle. Hence, roller 16 is free to rotate about spindles 62. One bearing cap is provided in ring 58 at each end of the roller and a second bearing cap 66 is provided at the inner end of each spindle 62. An outer spindle cap or plate 68 holds said spindle in position in the frame blocks. Spindle 62 being generally cylindrical is provided on the inside thereof with an impeller motor mounting spider 70 which is secured to the body of the spindle. Spider 70 would be a spoke type element comprising several radial arms so that the inside of spindle 62 is essentially unobstructed. Spider 70 supports a hydraulic impeller motor 72 to the shaft of which is attached impeller 74.

In operation the harvester vessel to which the conveyor is attached will move through the kelp and sea plant beds with the cutter bars severing the plants immediately ahead of the bottom end of the conveyor. With the impellers 74 rotating at each end of roller 16 water in substantial quantities is drawn through the conveyor belts, through the slots in the roller and discharged from inside the roller through the spindle and out the sides of the conveyor table. The suction or drawing action created by the roller attracts severed sea plant and kelp sections to the conveyor so that they can be picked up by the conveyor belt and belt lugs to be deposited in the hold of the vessel. Thus, with the drawing action of the suction roller kelp and sea plant material which has been severed is not lost since it does not have an opportunity to sink before it is picked up by the conveyor. All of the drive motors and cylinders attached to the conveyor are generally and preferably hydraulically driven so that speeds thereof may be varied to coordinate and synchronize the various elements. The impeller motors 72 are also hydraulically driven. The impellers may assume many shapes and this invention is not intended to restrict itself to any particular type impeller for the invention. While any number of blades may be used on the impeller it is found that a two blade is particularly effective for the purposes of creating maximum suction or drawing power through the slots 54.

The foregoing is considered to be merely descriptive of the preferred embodiments of this invention. Since numerous modifications and equivalents may be devised by those skilled in the art it is not desired to limit the invention to the exact construction and operation shown and described. Accordingly, it is intended that all suitable equivalents should fall within the scope of the invention.

What is claimed is:

1. A suction roller apparatus for conveyor means, comprising: (a) a generally rectangular conveyor table means with main side frame members adapted to be mounted at an angle and having a pervious, continuous conveyor belt thereon, said belt being disposed about a first roller located at the upper end of said conveyor table and a second roller located at the lower end of said table, (b) said conveyor side frame members having openings therein coinciding generally with the ends of said second roller, (c) said second roller being generally cylindrical and open at the ends and also being rotatably mounted and having a plurality of slots therein to permit passage of fluid through said slots, and (d) power driven impeller means mounted in said side frame member openings for drawing fluid through said pervious belt, through said slots to the inside of said second roller to be discharged out the sides of said conveyor through said openings in said side frame members.

2. The apparatus according to claim 1 and in which said plurality of slots in said second roller are largest near the center thereof and which become generally progressively smaller toward the ends thereof.

3. The apparatus according to claim 1 and in which said impeller means and the power means for driving same comprise a motor means with a drive shaft to which shaft said impeller means is secured and both of which motor means and impeller means are located generally centrally of said openings in such a way that said openings are generally unobstructed.

4. A suction roller apparatus for conveyor means, comprising: (a) a generally rectangular conveyor table means with main spaced apart, side frame members adapted to be mounted at an angle and having a pervious, continuous conveyor belt thereon, said belt being disposed about a first transversely disposed roller located at the upper end of said table and a second transversely roller located at the lower end of said table, (b) said conveyor side frame members each having a substantially round and large opening therein coinciding generally with its respective end of said second roller, said openings being of lesser diameter than said second roller, (c) said second roller being generally cylindrical and open at the ends and also being rotatably mounted and having a plurality of slots therein to permit passage of fluid through said slots, and (d) impeller means mounted in said side frame member openings for drawing fluid through said pervious belt, through said slots to the inside of said second roller to be discharged out the sides of said conveyor through said openings in said side frame members.

5. The apparatus according to claim 4 and in which said plurality of slots in said second roller are largest near the center thereof and which become generally progressively smaller toward the ends thereof.

6. The apparatus according to claim 4 and in which said impeller means and the power means for driving same comprise a motor means with a drive shaft to which shaft said impeller means is secured and both of which motor means and impeller means are located generally centrally of said openings in such a way that said openings are generally unobstructed.

References Cited by the Examiner

UNITED STATES PATENTS 1,028,671   6/1912   Brooks _____ 56—9

EVON C. BLUNK, *Primary Examiner.*

E. A. SROKA, *Assistant Examiner.*